United States Patent

[11] 3,632,168

[72] Inventors Joseph G. Barello
Detroit;
Donald K. Keller, Grosse Pointe Farms;
Anthony S. Rish, Detroit, all of Mich.
[21] Appl. No. 877,338
[22] Filed Nov. 17, 1969
[45] Patented Jan. 4, 1972
[73] Assignee Chrysler Corporation
Highland Park, Mich.

[54] SEAT BACK LATCH
3 Claims, 8 Drawing Figs.
[52] U.S. Cl. .................................................. 297/379
[51] Int. Cl. .................................................. B60n 1/04
[50] Field of Search .......................................... 297/379,
378; 296/65

[56] References Cited
UNITED STATES PATENTS

| 3,262,725 | 7/1966 | Ballantyne | 297/379 |
| 3,297,361 | 1/1967 | Murdoch | 297/379 |
| 3,321,243 | 5/1967 | Ferrara | 297/378 |
| 3,339,976 | 9/1967 | Karl | 297/379 |
| 3,387,885 | 6/1968 | Boschen | 297/379 |

Primary Examiner—Francis K. Zugel
Attorney—Harness, Talburtt and Baldwin

ABSTRACT: A latch for the pivotal seat back of a motor vehicle seat comprising a button positioned in an aperture in the outboard face of the outboard hinge arm of the seat back and having an inwardly extending push rod which pushingly engages the upper end of a pivotally mounted detent to pivot the lower end of the detent out of engagement with a spring loaded latch rotor and allow the rotor to rotate under the urging of its spring to an unlatched position with respect to a striker pin carried by the seat cushion.

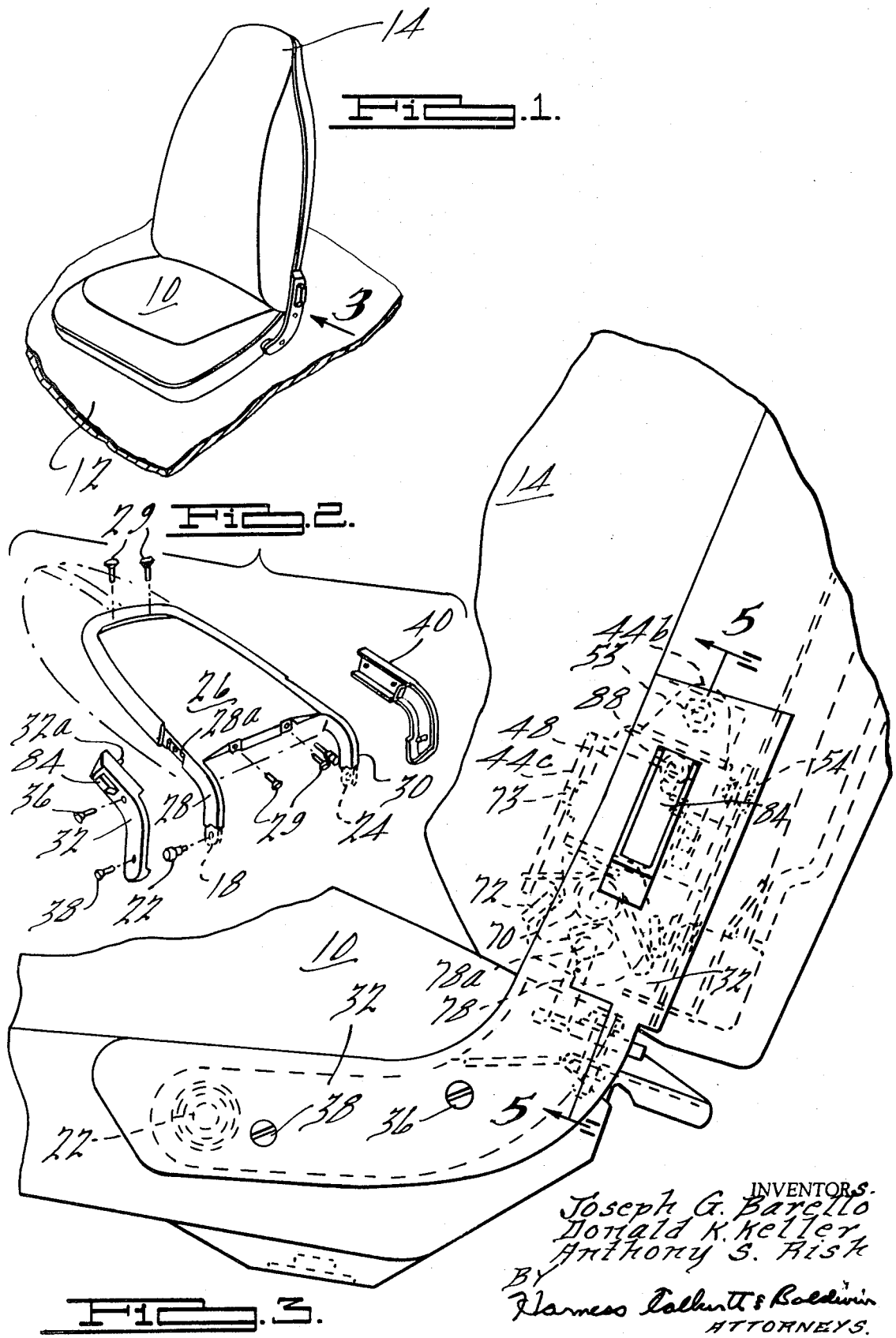

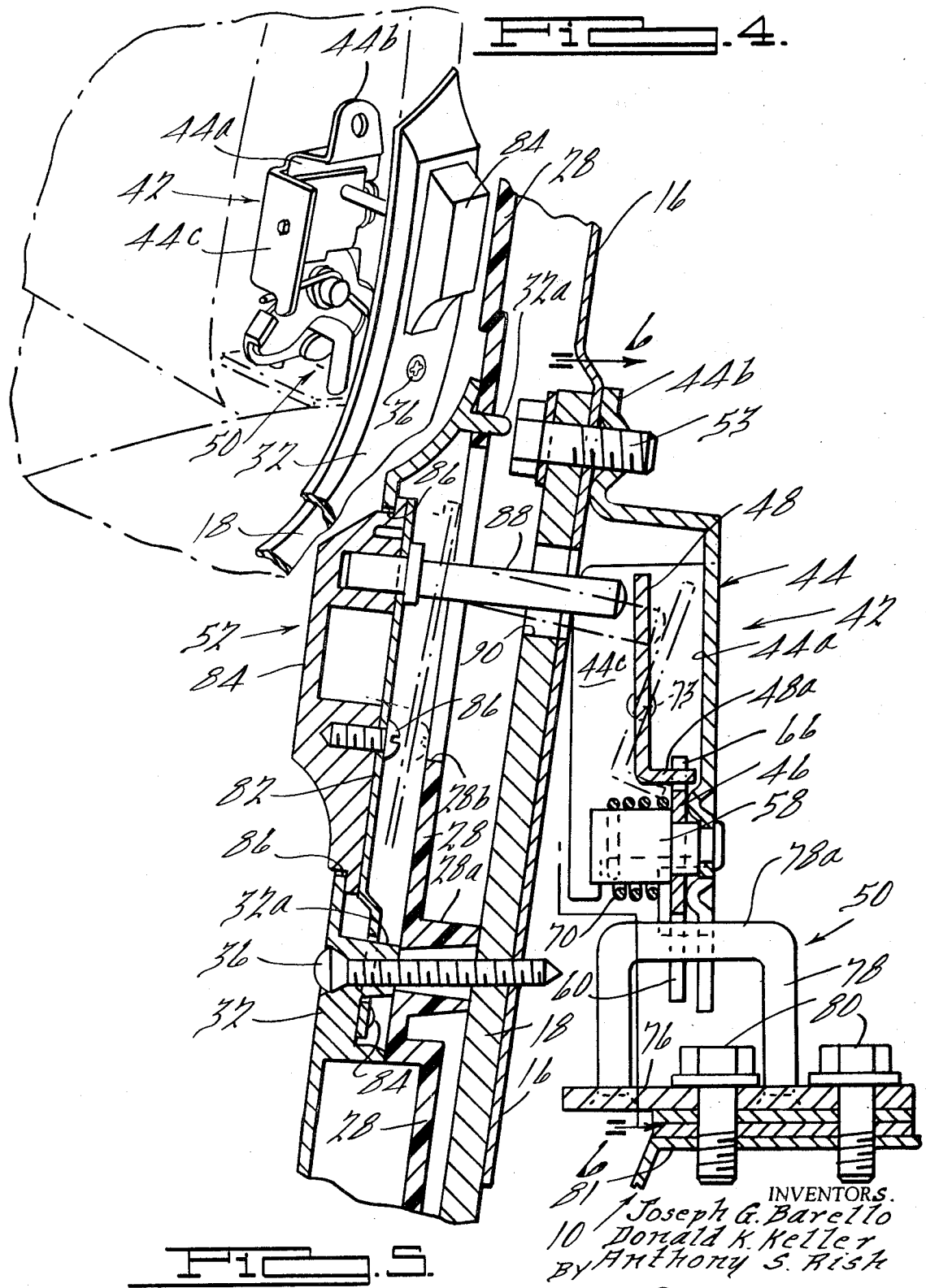

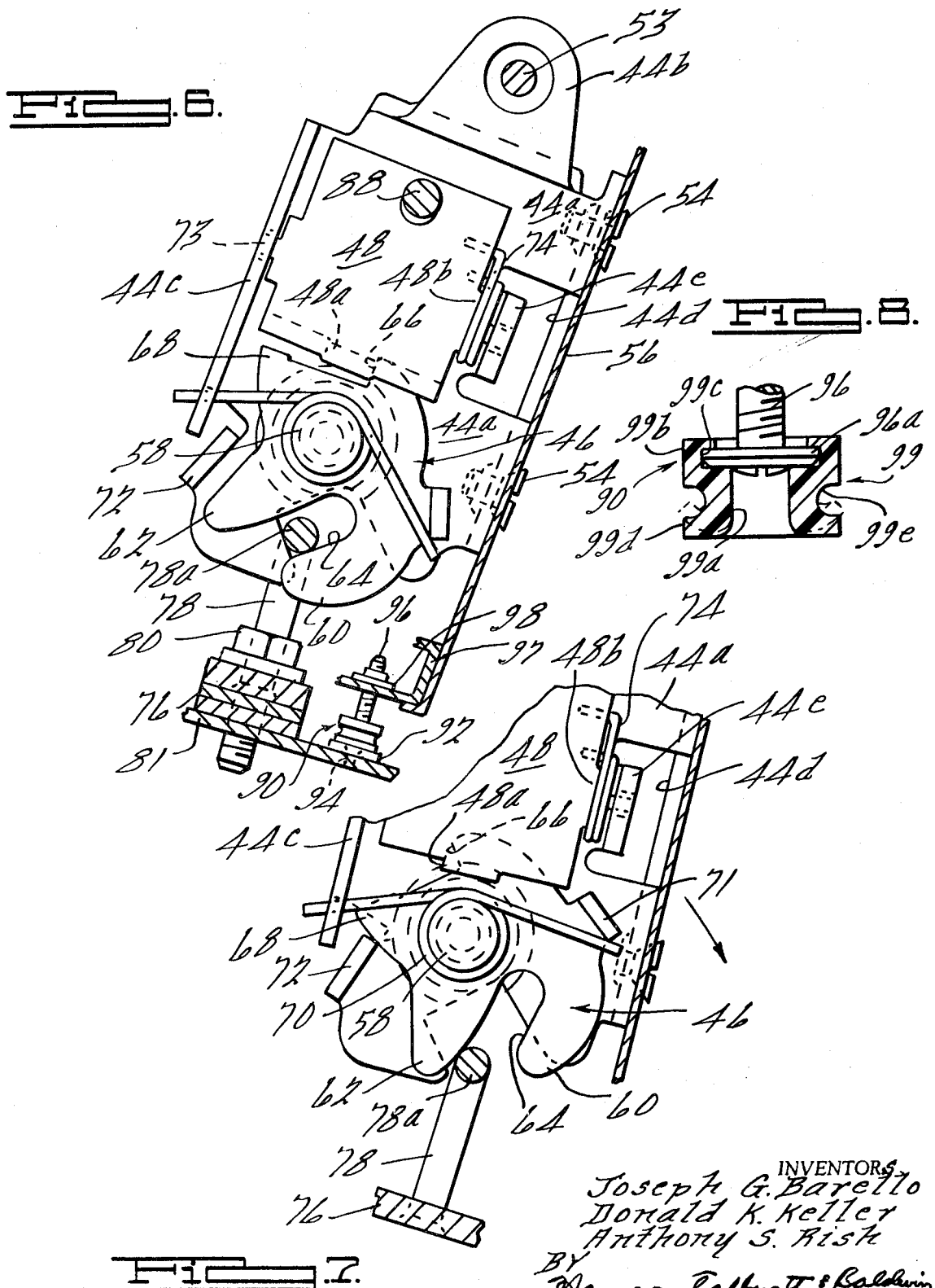

SEAT BACK LATCH

BACKGROUND OF INVENTION

This invention relates to latches for releasably securing pivoting seat backs in automobiles to the seat cushion so that the seat back is normally held in an upright seating position but may be released for forward pivotal movement to permit access to the rear passenger compartment of the vehicle. Many seat back latches of varying designs are presently available. Some of the presently available latches, however, are awkward to operate; others are complicated and expensive in design; and still others are inconveniently positioned on the vehicle seat.

SUMMARY OF INVENTION

The object of the present invention is to provide an improved automotive seat back latch. More specifically, the object of this invention is to provide a seat back latch which will be easy to operate, simple and inexpensive in design, and conveniently positioned on the seat back.

The seat back latch of the invention includes a latch element mounted on the seat cushion and another spring-biased latch element mounted on the seat back immediately inboard of the outboard seat back hinge arm for latching coaction with the first latch element to maintain the seat back in its upright seating position. A detent member is mounted on the seat back for releasable engagement with the latch element on the seat back to maintain that element in its position of latching coaction with the cushion-mounted latching element, and an actuator member extends through an aperture in the outboard hinge arm for engagement at its inboard end with the detent member. The actuator member presents a push surface at its outboard end, exteriorly of the seat back, for pushing engagement by an operator to move the detent out of engagement with the seat back latch element and allow that element to move under the urging of its spring to its unlatched position and thereby allow the seat back to be pivoted to its forwardly tilted position.

In the disclosed embodiment of the invention, the detent member comprises a pivotally mounted detent arm, and the actuator member comprises a rod member extending through the aperture in the outboard hinge arm for pushing engagement with the detent arm and a push button member secured to the outboard end of the rod member to provide the push surface. More specifically, the actuator member comprises a leaf spring member which is secured at one end to hinge arm cover member with the push button member secured to the outboard face of the spring member to position the pushbutton member in an aperture in the hinge arm cover for spring biased, cantilever movement within that aperture.

These and other objects, features and advantages of the invention will be apparent from the accompanying drawings and from the detailed description of the preferred embodiment of the invention.

BRIEF DESCRIPTION OF THE DRAWINGS

A preferred embodiment of the invention is illustrated in the drawings in which:

FIG. 1 is a perspective view of an automotive seat assembly embodying the seat back latch of the invention:

FIG. 2 is a perspective, partially exploded view of the seat back of the seat assembly of FIG. 1;

FIG. 3 is an enlarged, fragmentary view looking in the direction of the arrow 3 in FIG. 1;

FIG. 4 is an enlarged fragmentary perspective view of the lower outboard portion of the seat assembly of FIG. 1 with the seat cushion and seat back shown in phantom to show the internal construction of the seat back latch;

FIG. 5 is a cross-sectional view taken on line 5—5 of FIG. 3;

FIG. 6 is a cross-sectional view taken on line 6—6 of FIG. 5 and showing the latch elements in latched position;

FIG. 7 is a view similar to FIG. 6 but showing the latch elements in unlatched position; and FIG. 8 is a detail view of a bumper member embodied in the invention seat back latch.

DETAILED DESCRIPTION OF THE PREFERRED EMBODIMENT

The seat assembly seen in FIG. 1 comprises a bucket seat positioned in the forward portion of the passenger compartment of a motor vehicle on the driver's side so that the near side of the seat assembly in FIG. 1 is the outboard side of the assembly. The seat assembly comprises a seat cushion 10 suitably secured to the floor 12 of the vehicle, and a seat back 14.

Seat back 14 includes a frame structure to provide a support for the spring and fabric structures. The seat back frame structure includes a sheet metal side panel 16 (FIG. 5) and a hinge arm member or "hockey stick" 18 welded at its upper end to panel 16; hinge arm 18 extends downwardly from the outboard side of the seat back and then forwardly along seat cushion 10. The forward end of hinge arm 18 is pivotally secured to the frame of seat cushion 10 by a pivot pin 22. A similar hinge arm 24 (FIG. 2) is provided at the inboard side of seat back 14. Hinge arms 18 and 24 coact to mount seat back 14 for pivotal movement relative to seat cushion 10 about a generally horizontal axis between the generally upright seating position of FIG. 1 and a forwardly tilted position allowing access to the rear portion of the passenger compartment.

Seat back 14 further includes a seat back shield 26 (FIG. 2) positioned against the rear face of the seat back and having downwardly depending hinge arm portions 28, 30 which embrace the hinge arms 18, 24 of the seat back frame structure. Shield 26 is secured to the seat back by upper screws 28 and lower screws 30. A hinge arm cover 32 is secured to the outboard face of hinge arm 18 by an upper screw 36, a lower screw 38 and a pilot pin 32a received in a guide hole in shield 26. Upper screw 36 passes through a boss 32a (FIG. 5) on the inboard face of cover 32 and through a boss 28a on the inboard face of shield hinge arm portion 28 for threading engagement with hinge arm 18 and frame panel member 16. Lower screw 38 passes through the hinge arm and through a notch in the lower end of shield hinge arm portion 28 for threading engagement with hinge arm 18. Cover 32 thus serves to secure shield hinge arm portion 28 to hinge arm 18. A similar hinge arm cover 40 is similarly secured to hinge arm 24.

Seat back 14 is releasably held in its upright seating position by a latch assembly seen generally at 42 in FIGS. 4–7.

Latch assembly 42 includes a mounting bracket 44, a rotor 46, a detent 48, a striker 50, and an actuator assembly 52.

Mounting bracket 44 is formed as a sheet metal stamping and includes a main body or plate portion 44a, an upper finger portion 44b threadably receiving a screw bolt 53 passing through the upper end of hinge arm 18 to mount bracket 44 immediately inboard of the hinge arm, an outturned flange portion 44c, and an inturned flange portion 44d (FIGS. 6 and 7) receiving screw bolts 54 to secure bracket 44 to a seat back rear panel 56 integral with side panel 16.

Rotor 46 is mounted for rotary movement about an axis generally parallel to the seat back pivotal axis by a pin 58 carried by bracket plate portion 44a. Rotor 46 includes a latch arm 60, a throwout arm 62, a throat 64 defined between the latch and throwout arms, a detent tooth 66, and a stop arm 68. A coil spring 70 wound around pin 58 bears at one end against the lower edge of bracket flange portion 44c and at its other end against a tab 71 on rotor 46; spring 70 acts to continually bias rotor 46 for movement in a counterclockwise direction as viewed in FIGS. 6 and 7 with the counterclockwise movement being limited and defined by abutting engagement of rotor stop arm 68 with a tab 72 on bracket plate portion 44a.

Detent 48 comprises a sheet metal stamping in the form of a plate having opposite trunnions 73 received in suitable apertures in bracket flange portion 44c and in a tab 44e struck from bracket plate portion 44a. Tab 44e and flange portion 44c thus coact to mount detent 48 for pivotal movement about an axis generally normal to the seat back pivotal axis between a latched position in which a finger 48a on the lower end of the detent engages detent tooth 66 and a released position in which detent finger 48a is swung clear of detent tooth 66. A coil spring 74 is wound around a laterally extending portion 48b of detent 48. Spring 74 bears at one end against the inboard face of detent 48 and at its other end against bracket plate portion 44a and acts to continually bias detent 48 for pivotal movement in a counterclockwise direction as viewed in FIG. 5.

Striker 50 includes a plate 76 and a U-shaped striker pin 78 rigidly upstanding from plate 76; a pair of screw bolts 80 pass through plate 76 and threadably engage the frame 81 of seat cushion 10 to arrange the bite 78a of striker pin 78 in a position generally parallel to the seat back pivotal axis.

Actuator assembly 52 includes a leaf spring member 82 secured at its lower end as by a rivet 84 to the inside face of hinge arm cover 32 and having an aperture 82a to clear hinge arm cover boss 32a, a molded button member 84 secured by screw 86 to the outboard face of spring member 82 and positioned in an aperture 86 in hinge arm cover 32, and a rod member 88 received at its outboard end with a force fit in button member 84 and extending inwardly therefrom through a cutout 28b in shield hinge arm portion 28 and thence through an aperture 90 in hinge arm 18 for engagement at its inboard end with the upper end of detent 48.

A bumper assembly 90 (see in assembled relation to the seat back in FIG. 6 and in isolated detail in FIG. 8) determines the upright seating position of the seat back. Bumper assembly 90 includes a metal washer 92 secured by a screw 94 to seat cushion frame 81, a screw bolt 96 passing upwardly through lower seat back frame crossmember 97 for adjustable, threading engagement with a weld nut 98 carried by crossmember 97. Bumper 99 2 formed of an elastomeric material (for example, a dense polyurethane of the type available from Mobay Chemical Company of Pittsburgh, Pa. under the trade designation Texin 591A and includes a central bore 99a, a main body portion 99b including an internal groove 99c receiving bolt head 96a, and a lower lip portion 99d separated from main body portion 99b by an external groove 99e.

OPERATION OF THE PREFERRED EMBODIMENT

The latch assembly is seen in its unlatched condition in FIG. 7; the seat back in this FIG. is seen pivoting rearwardly toward its upright seating position. As the seat back approaches its seating position, throwout arm 62 cammingly engages striker bite portion 78a to rotate rotor 46 clockwise to the position of FIG. 6, whereat detent 48 is rotated inwardly by its spring 74 to a position of latching engagement with rotor detent tooth 66. Detent 48 thus coacts with detent tooth 66 to maintain the seat being in its latched position with any forward pivotal movement of the seat being precluded by abutment of striker bite portion 78a with rotor latch arm 60. Bumper assembly 90 is adjusted so that, as the seat back assumes its latched condition, urethane bumper 98 is somewhat compressed. Specifically, as the detent moves into latching engagement with the rotor, the lower lip portion 99d of the bumper splays resiliently outwardly to its dotted line position of FIG. 8, bumper 98 thus acts to continuously bias the seat back toward its forwardly tilted position to urge rotor latch arm 60 into firm nonrattling contact with striker bite portion 78a. When it is desired to release the seat back to gain access to the rear passenger compartment, pushbutton 84 is pushingly engaged by an operator's finger; leaf spring member 82 flexes in cantilever fashion to allow pushbutton 84 to move inwardly in response to operator pressure to move rod member 88 inwardly from its solid line latched position of FIG. 5 to its dotted line unlatching position of FIG. 5 in which the upper end of detent 48 has been pivoted inwardly to move detent finger 48a outwardly out of engagement with rotor detent finger 48a outwardly out of engagement with rotor detent tooth 66. A detent finger 48a swings clear of rotor 46, the rotor is free to move in a counterclockwise direction (as viewed in FIG. 6) under the combined urging of its spring and the unloading force generated by the splayed lower lip of bumper 98. The rotor spring and urethane bumper thus combine to move the rotor to its unlatched position of FIG. 7 with the seat back undergoing a slight forward tilting movement to allow the unlatching movement of the rotor.

Pushbutton 84 may now be released by the operator and the operator's hand placed on the top of the seat back to pivot the seat back to its forwardly tilted access position. The invention latch thus enables the operator to release the latch and pivot the seat with the same hand since the latch remains in the tripped or released condition after the pushbutton is released. The outboard location of the pushbutton on the seat back allows easy access to the latch release, the simple construction of the latch enables the latch to be inexpensively produced, and the direct action design of the latch provides a positive, simple latch operation.

Although the invention has been illustrated and described in detail with reference to a preferred embodiment, it will be understood that various changes may be made in the disclosed embodiment without departing from the scope or spirit of the invention.

We claim:

1. In a front vehicular seat assembly of the type including a seat cushion and a seat back having a frame structure including a hinge arm member extending downwardly from the outboard side of the seat back and pivotally secured at its lower end to said seat cushion to mount said seat back, in conjunction with pivot means at the inboard side of said seat back, for pivotal movement relative to said seat cushion about a generally horizontal axis between a generally upright seating position and a forwardly tilted position allowing access to the rear portion of the vehicle passenger compartment; a latch assembly for releasably maintaining said seat back in its upright seating position, said latch assembly comprising:

A. means defining an aperture in said hinge arm;
B. a first latch element mounted on said seat cushion;
C. a second latch element mounted on said seat back inboard of said hinge arm for latching coaction with said first latch element to maintain said seat back in its upright seating position;
D. spring means biasing said second latch element for movement in an unlatching direction out of latching coaction with said first latch element;
E. a detent member comprising a pivotally mounted detent arm mounted on said seat back and releasably engageable with said second latch element to maintain the latter in its position of latching coaction with said first latch element; and
F. an actuator member comprising a rod member extending through said hinge arm aperture for pushing engagement at its inboard end with said detent member to move said detent out of engagement with said second latch member to allow said second latch member to move under the urging of said spring means to its unlatched position and thereby allow said seat back to be moved to its forwardly tilted position, said actuator member further having a pushbutton member at the outboard end of said rod member and a leaf spring member secured at one end to said seat 2. In a front vehicular seat assembly of the type including a seat cushion and a seat back having a frame structure including a hinge arm member extending downwardly from the outboard side of the seat back and pivotally secured at its lower end to said seat cushion to mount said seat back, in conjunction with pivot means at the inboard side of said seat back, for pivotal movement relative to said seat cushion about a generally horizontal axis between a generally upright seating position and a forwardly tilted position allowing access to the rear portion of the vehicle passenger compartment; a latch assembly for releasably maintaining said seat back in its upright seating position, said latch assembly comprising:
- A. means defining an aperture in said hinge arm;
- B. a first latch element mounted on said seat cushion;
- C. a second latch element mounted on said seat back inboard of said hinge arm for latching coaction with said first latch element to maintain said seat back in its upright seating position;
- D. spring means biasing said second latch element for movement in an unlatching direction out of latching coaction with said first latch element;
- E. a detent member comprising a pivotally mounted detent arm mounted on said seat back and releasably engageable with said second latch element to maintain the latter in its position of latching coaction with said first latch element;
- F. a hinge arm cover overlying and secured to the outboard face of said hinge arm and having an aperture in alignment with said hinge arm aperture;
- G. an actuator member comprising a rod member having a pushbutton member at its outboard end, said rod extending through said hinge arm aperture for pushing engagement at its inboard end with said detent member to move said detent out of engagement with said second latch member to allow said second latch member to move under the urging of said spring means to its unlatched position and thereby allow said seat back to be moved to its forwardly tilted position; and
- H. a leaf spring member secured at one end to the inboard face of said hinge arm cover and projecting into said hinge arm cover aperture with said pushbutton member being secured to the outboard face of said leaf spring member so that the leaf spring member mounts said pushbutton member within said hinge arm cover aperture for inward cantilever movement with to said hinge arm cover 3. In a front vehicular seat assembly of the type including a seat cushion and a seat back having a frame structure including a hinge arm member extending downwardly from the outboard side of the seat back and pivotally secured at its lower end to said seat cushion to mount said seat back, in conjunction with pivot means at the inboard side of said seat back, for pivotal movement relative to said seat cushion about a generally horizontal axis between a generally upright seating position and a forwardly tilted position allowing access to the rear position of the vehicle passenger compartment; a latch assembly for releasably maintaining said seat back in its upright seating position, said latch assembly comprising:
- A. means defining an aperture in said hinge arm;
- B. a first latch element mounted on said seat cushion;
- C. a second latch element mounted on a pin for rotary movement on said seat back inboard of said hinge arm for latching coaction with said first latch element to maintain said seat back in its upright seating position;
- D. spring means biasing said second latch element for movement in an unlatching direction out of latching coaction with said first latch element;
- E. a detent member mounted on said seat back and releasably engageable with said second latch element to maintain the latter in its position of latching coaction with said first latch element, said detent comprising a generally flat plate having opposite end portions and positioned in a plane generally parallel to said second latch element, said detent being pivotally supported intermediate said end portions so as to pivot about an axis generally centrally of said plate and having a detent tooth at one end portion of said plate engageable with said second latch element, with said opposite end portion on the other side of said plate pivot axis from said tooth providing an actuator engageable surface;
- F. an actuator member comprising a rod member having a pushbutton member at the outboard end thereof to provide a push surface for engagement by the operator, said rod extending through said hinge arm aperture for engagement at its inboard end with said detent member to move said detent out of engagement with said second latch member to allow said second latch member to move under the urging of said spring means to its unlatched position and thereby allow said seat back to be moved to its forwardly tilted position; and
- G. said rod member having a movement generally parallel to the axis of rotation of said second latch member and said rod member contacting said detent plate on the plate end portion on the side opposite of the plate pivot axis from said detent tooth.

* * * * *